United States Patent
Sehata et al.

(10) Patent No.: US 11,692,092 B2
(45) Date of Patent: Jul. 4, 2023

(54) ANTI-STICKING AGENT COMPOSITION FOR UNVULCANIZED RUBBER, AQUEOUS DISPERSION LIQUID OF ANTI-STICKING AGENT COMPOSITION FOR UNVULCANIZED RUBBER, AND UNVULCANIZED RUBBER

(71) Applicant: LION SPECIALTY CHEMICALS CO., LTD., Tokyo (JP)

(72) Inventors: Shiro Sehata, Tokyo (JP); Kazuyuki Sakamoto, Tokyo (JP); Takao Oka, Tokyo (JP)

(73) Assignee: LION SPECIALTY CHEMICALS CO., LTD., Tokyo (JP)

( * ) Notice: Subject to any disclaimer, the term of this patent is extended or adjusted under 35 U.S.C. 154(b) by 164 days.

(21) Appl. No.: 17/239,674

(22) Filed: Apr. 25, 2021

(65) Prior Publication Data
US 2021/0363339 A1 Nov. 25, 2021

(30) Foreign Application Priority Data
May 22, 2020 (JP) ................................. 2020-089837

(51) Int. Cl.
*C08L 29/04* (2006.01)
*C08L 9/06* (2006.01)

(52) U.S. Cl.
CPC ................. *C08L 29/04* (2013.01); *C08L 9/06* (2013.01); *C08L 2205/03* (2013.01)

(58) Field of Classification Search
CPC .................................. C08L 29/04; C08L 9/06
USPC ........................................................... 524/43
See application file for complete search history.

(56) References Cited

U.S. PATENT DOCUMENTS

| 2004/0209080 A1* | 10/2004 | Hayakawa | ................. C08J 3/12 |
| | | | 264/330 |
| 2019/0016872 A1* | 1/2019 | Oka | ........................ C08K 5/098 |
| 2020/0255604 A1* | 8/2020 | Sakamoto | .............. C08K 3/346 |

FOREIGN PATENT DOCUMENTS

| JP | S50149770 | 12/1975 | |
| JP | S6232127 | 2/1987 | |
| JP | 2009161667 | 7/2009 | |
| JP | 2013001720 | 1/2013 | |
| WO | WO-2019050027 A1 * | 3/2019 | ........ B01F 15/00155 |

* cited by examiner

*Primary Examiner* — Deve V Hall
(74) *Attorney, Agent, or Firm* — JCIPRNET

(57) ABSTRACT

An anti-sticking agent composition for an unvulcanized rubber of the present disclosure includes the following components (A) to (C), and water is provided. The component (A) contains the following component (A1) and the following component (A2). The component (A) is water-soluble polymer, the component (B) is metallic soap, the component (C) is surfactant, the component is (A1) water-soluble polymer other than the component (A2), and the component (A2) is non-ionic cellulose ether.

8 Claims, No Drawings

ANTI-STICKING AGENT COMPOSITION FOR UNVULCANIZED RUBBER, AQUEOUS DISPERSION LIQUID OF ANTI-STICKING AGENT COMPOSITION FOR UNVULCANIZED RUBBER, AND UNVULCANIZED RUBBER

CROSS-REFERENCE TO RELATED APPLICATION

This application claims the priority benefit of Japan Application No. 2020-089837, filed on May 22, 2020. The entirety of the above-mentioned patent application is hereby incorporated by reference herein and made a part of this specification.

BACKGROUND

Technical Field

The present disclosure relates to an anti-sticking agent composition for an unvulcanized rubber, an aqueous dispersion liquid of an anti-sticking agent composition for an unvulcanized rubber, and an unvulcanized rubber.

Description of Related Art

At the site of rubber production and processing, adhesion of an anti-sticking agent to a surface of rubber is caused for the purpose of preventing sticking of rubber (for example, an unvulcanized rubber).

An anti-sticking agent for rubber containing an inorganic powder as a main component is widely used as an anti-sticking agent for rubber. Generally, this anti-sticking agent can be prepared in a form of an aqueous dispersion liquid and used by being adhered to a surface of rubber (Patent Document 1 and 2). Furthermore, various anti-sticking agents formed using a water-soluble polymer or the like have been proposed to reduce dust derived from an inorganic powder. For example, in Patent Document 3 and Patent Document 4, adherability of an anti-sticking agent with respect to a surface of rubber is improved by blending in a water-soluble polymer (sodium alginate, CMC, sodium polyacrylate, PVA, and the like), a water-soluble polysaccharide (xanthan gum), and the like, and thereby increasing a viscosity of an aqueous dispersion liquid of the anti-sticking agent.

[Patent Document 1] Japanese Patent Laid-Open No. S50-149770
[Patent Document 2] Japanese Patent Laid-Open No. 2013-001720
[Patent Document 3] Japanese Patent Laid-Open No. S62-032127
[Patent Document 4] Japanese Patent Laid-Open No. 2009-161667

After an application treatment with an anti-sticking agent on unvulcanized rubber, a dried substance of the anti-sticking agent may peel off from a surface of the unvulcanized rubber and may adhere to a surface of equipment (such as a metal surface) used in the application treatment. As mentioned above, when the anti-sticking agent adhered to the equipment (hereinafter sometimes referred to as a "substance adhered to equipment") can not be removed, there is concern that this substance adhered to equipment might contaminate the piece of equipment and its surrounding environment. Accordingly, an anti-sticking agent for an unvulcanized rubber which has an excellent property of being easily removed by physical force as a substance adhered to equipment (hereinafter sometimes referred to as "removability as a substance adhered to equipment") is required.

Accordingly, the present disclosure provides an anti-sticking agent composition for an unvulcanized rubber, an aqueous dispersion liquid of an anti-sticking agent composition for an unvulcanized rubber, and an unvulcanized rubber, which can achieve both excellent anti-sticking properties and excellent removability as a substance adhered to equipment.

SUMMARY

According to an aspect, an anti-sticking agent composition for an unvulcanized rubber of the present disclosure includes:
the following components (A) to (C); and water, wherein the component (A) contains the following component (A1) and the following component (A2):
(A) water-soluble polymer
(B) metallic soap
(C) surfactant
(A1) water-soluble polymer other than the component (A2)
(A2) non-ionic cellulose ether
According to another aspect, an aqueous dispersion liquid of an anti-sticking agent composition for an unvulcanized rubber of the present disclosure includes: the above-described anti-sticking agent composition for an unvulcanized rubber of the present disclosure; and water.
According to still another aspect, an unvulcanized rubber of the present disclosure has a surface to which the components (A) to (C) in the anti-sticking agent composition for an unvulcanized rubber of the present disclosure are adhered.

DESCRIPTION OF THE EMBODIMENTS

According to the present disclosure, it is possible to provide an anti-sticking agent composition for an unvulcanized rubber, an aqueous dispersion liquid of an anti-sticking agent composition for an unvulcanized rubber, and an unvulcanized rubber, which can achieve both excellent anti-sticking properties and excellent removability as a substance adhered to equipment.

Hereinafter, the present disclosure will be described in more detail with reference to examples. However, the present disclosure is not limited by the following description.

An anti-sticking agent composition for an unvulcanized rubber of the present disclosure may include, for example, 25 to 70 mass % of a component (A); 20 to 60 mass % of a component (B); and 10 to 20 mass % of a component (C), with respect to 100 mass % as a total mass of the components other than water. Accordingly, for example, it is possible to obtain an anti-sticking agent for an unvulcanized rubber which enables compatibility between excellent anti-sticking properties and excellent removability as a substance adhered to equipment, which is low in cost, and which further has an excellent lubricating ability and excellent dispersibility. In the present disclosure, the term "lubricating ability" is defined as a property of reducing frictional resistance generated on a contact surface when an unvulcanized rubber to which the anti-sticking agent composition for an unvulcanized rubber is applied comes into contact with other rubbers, metals, and the like. Furthermore, the term "dispersibility" is defined as a property of the anti-sticking agent composition for an unvulcanized rubber and its dried substance being able to be dispersed. It can be said that the dispersibility of the anti-sticking agent composition for an unvulcanized rubber is excellent when the dispersibility becomes lower (unlikely to disperse).

In the present disclosure, a method of measuring anti-sticking properties, removability as a substance adhered to equipment, a lubricating ability, and dispersibility is not particularly limited, but for example, measurement can be performed by a method described in examples to be described later.

In the anti-sticking agent composition for an unvulcanized rubber of the present disclosure, for example, a mass ratio (A1)/(A2) of the component (A1) to the component (A2) may be within a range of 1 to 20. Accordingly, for example, it is possible to obtain an anti-sticking agent for an unvulcanized rubber which enables compatibility between excellent anti-sticking properties and excellent removability as a substance adhered to equipment, and which is low in cost.

In the anti-sticking agent composition for an unvulcanized rubber of the present disclosure, for example, a mass ratio (A)/(B) of the component (A) to the component (B) may be within a range of 0.5 to 3. Accordingly, for example, it is possible to obtain an anti-sticking agent for an unvulcanized rubber which enables compatibility between an excellent lubricating ability and excellent dispersibility.

A method of an anti-sticking treatment on an unvulcanized rubber of the present disclosure may be, for example, a method of an anti-sticking treatment on an unvulcanized rubber, the method including an anti-sticking treatment process in which the components (A) to (C) in the anti-sticking agent composition for an unvulcanized rubber of the present disclosure are adhered to a surface of an unvulcanized rubber and subjected to an anti-sticking treatment. The anti-sticking treatment process may be, for example, a process of adhering the anti-sticking agent composition for an unvulcanized rubber of the present disclosure or an aqueous dispersion liquid of an anti-sticking agent composition for an unvulcanized rubber of the present disclosure to a surface of the unvulcanized rubber, further volatilizing water, and thereby adhering the components (A) to (C) in the anti-sticking agent composition for an unvulcanized rubber of the present disclosure to the surface of the unvulcanized rubber. More specifically, the anti-sticking treatment process may include, for example, a process of adhering an anti-sticking agent composition for an unvulcanized rubber in which the anti-sticking agent composition for an unvulcanized rubber of the present disclosure is adhered to a surface of an unvulcanized rubber, and a drying process of drying the anti-sticking agent composition for an unvulcanized rubber on the surface of the unvulcanized rubber to form a film on the surface of the unvulcanized rubber.

Hereinafter, specific examples of the present disclosure will be described in more detail.

1. Anti-sticking agent composition for unvulcanized rubber

As described above, the anti-sticking agent composition for an unvulcanized rubber of the present disclosure includes:
the following components (A) to (C); and water:
(A) water-soluble polymer
(B) metallic soap
(C) surfactant,
wherein the component (A) contains the following component (A1) and the following component (A2):
(A1) water-soluble polymer other than the component (A2)
(A2) non-ionic cellulose ether.

The anti-sticking agent composition for an unvulcanized rubber of the present disclosure which contains the above-mentioned components (A) to (C) enables compatibility between excellent anti-sticking properties and excellent removability as a substance adhered to equipment.

Hereinafter, each of the components of the anti-sticking agent composition for an unvulcanized rubber of the present disclosure will be described.

1-1. Component (A): Water-Soluble Polymer

The component (A) is a water-soluble polymer as described above. In the anti-sticking agent composition for an unvulcanized rubber of the present disclosure, the component (A), that is, the water-soluble polymer (hereinafter sometimes referred to as a "water-soluble polymer (A)") is able to dispersed or dissolved in the anti-sticking agent composition for an unvulcanized rubber of the present disclosure through putting in water or putting in water and then heated. Accordingly, for example, a coating effect on an unvulcanized rubber can be obtained, and an anti-sticking effect can be obtained. A content of the water-soluble polymer (A) in the anti-sticking agent composition for an unvulcanized rubber of the present disclosure is not particularly limited. For example, with respect to a total mass of the components (solid contents) other than water, a lower limit thereof may be, for example, 30 mass % or more, 40 mass % or more, or 50 mass % or more, and an upper limit thereof may be, for example, 60 mass % or less, 40 mass % or less, or 35 mass % or less although it is not particularly limited. When a content of the water-soluble polymer (A) is 30 mass % or more with respect to the total mass of the components other than water, it is possible to obtain, for example, an effect of coating an unvulcanized rubber. Furthermore, when a content of the water-soluble polymer (A) in the anti-sticking agent composition for an unvulcanized rubber of the present disclosure is 60 mass % or less with respect to the total mass of the components other than water, the anti-sticking agent composition for an unvulcanized rubber has excellent drying properties and thereby can be dried quickly.

As described above, the component (A) includes the component (A1) and the component (A2). The component (A1) is a water-soluble polymer other than the component (A2), and the component (A2) is a non-ionic cellulose ether.

1-1-1. Component (A1): Water-Soluble Polymer Other than Component (A2)

The component (A1) functions as, for example, a film-forming agent. Furthermore, for example, when the component (A1) and the component (B) are used in combination, anti-sticking properties are exhibited.

The component (A1) is not particularly limited, but it may be, for example, a polymer in which a lower limit of solubility in 100 g of water at 25° C. is 1 g or more, 10 g or more, or 50 g or more. Furthermore, a mass average molecular weight of the "polymer" is not particularly limited in the present disclosure, but a lower limit of the mass average molecular weight may be, for example, 1,000 or more, 5,000 or more, or 10,000 or more, and an upper limit of the mass average molecular weight may be, for example, 500,000 or less although it is not particularly limited.

Types of the component (A1) are not particularly limited. Furthermore, only one type may be used, or a plurality of types may be used in combination. The component (A1) may be, for example, a synthetic water-soluble polymer or may be a natural water-soluble polymer. The "synthetic water-soluble polymer" may be, for example, a water-soluble polymer obtained by artificially synthesizing a polymer having a chemical structure that does not exist in nature, or may be a water-soluble polymer obtained by artificially synthesizing a polymer having a chemical structure that exists in nature. Furthermore, the "natural water-soluble polymer" may be, for example, a water-soluble polymer obtained by extracting or producing a polymer having a chemical structure that exists in nature from nature. The synthetic water-soluble polymer is not particularly limited. Examples thereof include carboxymethyl cellulose (CMC), polyacrylic acid, sodium polyacrylate, polyacrylamide, polyvinyl alcohol (PVA), polyvinylpyrrolidone, polyethylene glycol, polyethylene oxide, a water-soluble urethane resin, a water-soluble melamine resin, a water-soluble epoxy resin, a water-soluble butadiene resin, a water-soluble phenol resin, and the like. The natural water-soluble polymer is not particularly limited. Examples thereof include protein, xanthan gum, guar gum, welan gum, locust bean gum, diutan gum, tamarind gum, tamarind seed gum, tragacanth gum, arabic gum, carrageenan, rhamsan gum, succinoglycan, tara gum, gellan gum, karaya gum, pectin, alginic acid derivatives, cellulose ethers, and the like.

The component (A1) is preferably polyvinyl alcohol, carboxymethyl cellulose (CMC), polyacrylic acid, sodium polyacrylate, starch, mannan, alginic acid, natural gums, proteins, polyvinylpyrrolidone, polyethylene glycol, polyethylene oxide, a polyacrylamide resin, a water-soluble urethane resin, a water-soluble melamine resin, a water-soluble epoxy resin, a water-soluble butadiene resin, a water-soluble phenol resin, or the like; is more preferably at least one selected from the group consisting of polyvinyl alcohol (PVA), CMC, sodium polyacrylate, and a polyacrylamide resin; and is even more preferably at least one of polyvinyl alcohol and sodium polyacrylate. A viscosity of CMC is a viscosity of a 2 mass % aqueous solution, and it is preferably 10 to 100,000 mPa·s, is more preferably 100 to 100,000 mPa·s, and is even more preferably 200 to 90,000 mPa·s. A viscosity of PVA is a viscosity of a 4 mass % aqueous solution, and it is preferably 2 to 500 mPa·s, is more preferably 5 to 400 mPa·s, and is even more preferably 10 to 200 mPa·s. A viscosity of the component (A1) is preferably not excessively low from the viewpoint of increasing an adhesion amount of the anti-sticking agent composition for an unvulcanized rubber of the present disclosure with respect to an unvulcanized rubber. A viscosity of the component (A1) is preferably not excessively high from the viewpoint of improving drying properties of the anti-sticking agent composition for an unvulcanized rubber of the present disclosure. In the present disclosure, the "adhesion amount" of the anti-sticking agent composition for an unvulcanized rubber refers to an adhesion amount of all components other than water in the anti-sticking agent composition for an unvulcanized rubber with respect to a surface of an unvulcanized rubber.

A content (formulation amount) of the component (A1) in the anti-sticking agent composition for an unvulcanized rubber of the present disclosure is not particularly limited. For example, it may be 3 to 20 mass %, 4 to 18 mass %, or 5 to 16 mass %, with respect to a total mass of the anti-sticking agent composition for an unvulcanized rubber of the present disclosure; and for example, it may be 25 mass % or more with respect to 100 mass % as a total mass of the components (solid contents) other than water. A content of the component (A1) is, for example, 25 mass % or more, is preferably 25 to 75 mass %, is more preferably 28 to 70 mass %, and is even more preferably 30 to 65 mass %, with respect to 100 mass % as a total mass of the components other than water from the viewpoint of easiness of forming a film after applying an anti-sticking agent for an unvulcanized rubber. A content of the component (A1) is preferably less than 20 mass % with respect to a total mass of the anti-sticking agent composition for an unvulcanized rubber of the present disclosure in order to prevent an excessive increase in viscosity of the anti-sticking agent composition for an unvulcanized rubber of the present disclosure, resulting in a deterioration in handleability.

1-1-2. Component (A2): Non-Ionic Cellulose Ether

The component (A2) is a non-ionic cellulose ether as described above. The component (A2) functions so that anti-sticking properties and removability as a substance adhered to equipment are improved by, for example, a heat gel effect, or toughening of a film of an anti-sticking agent for an unvulcanized rubber itself. Specifically, for example, the component (A2) thicken the anti-sticking agent composition for an unvulcanized rubber of the present disclosure on a high-temperature unvulcanized rubber immediately after kneading, thereby improving adherability of the anti-sticking agent composition for an unvulcanized rubber of the present disclosure, and improving anti-sticking properties thereof. Furthermore, for example, by using the component (A2) and the component (A1) in combination, it is possible to obtain an anti-sticking agent composition for an unvulcanized rubber which exhibits excellent anti-sticking properties at low cost.

Types of the component (A2) are not particularly limited. Furthermore, only one type may be used, or a plurality of types may be used in combination. The component (A2) is preferably at least one selected from the group consisting of an alkyl cellulose, a hydroxyalkyl cellulose, or a hydroxyalkyl alkylcellulose. In these celluloses, an alkyl group is not particularly limited, but it is, for example, a linear or branched alkyl group having 1 to 3 carbon atoms, and only one type of alkyl group may be used, or a plurality of types of alkyl group may be used is combination. The component (A2) is more preferably a hydroxyalkyl methylcellulose such as hydroxyethyl methylcellulose, hydroxypropyl methylcellulose, and hydroxybutyl methylcellulose; an alkyl cellulose such as methyl cellulose, ethyl cellulose, and ethyl methyl cellulose; a hydroxyalkyl cellulose such as hydroxyethyl cellulose; and the like. It is even more preferably at least one selected from the group consisting of hydroxypropyl methylcellulose, methyl cellulose, ethyl cellulose, ethyl methyl cellulose, and hydroxyethyl methylcellulose. It is particularly preferably at least one selected from the group consisting of methyl cellulose, ethyl cellulose, and ethyl methyl cellulose.

A content (formulation amount) of the component (A2) in the anti-sticking agent composition for an unvulcanized rubber of the present disclosure is not particularly limited. For example, it may be 0.05 to 20 mass %, 0.1 to 15 mass %, 0.5 to 10 mass %, or 0.7 to 6 mass %, with respect to a total mass of the anti-sticking agent composition for an unvulcanized rubber of the present disclosure; and for example, it may be 0.1 to 25 mass % with respect to 100 mass % as a total mass of the components (solid contents) other than water. A content of the component (A2) is preferably 0.5 to 20 mass % and is more preferably 1 to 15 mass % with respect to 100 mass % as a total mass of the components other than water from the viewpoint of easiness of forming a film after applying an anti-sticking agent for an unvulcanized rubber. A content of the component (A2) is preferably less than 20 mass % with respect to a total mass of the anti-sticking agent composition for an unvulcanized rubber of the present disclosure in order to prevent an excessive increase in viscosity of the anti-sticking agent composition for an unvulcanized rubber of the present disclosure, resulting in a deterioration in handleability.

A degree of molar substitution (MS) of the component (A2) is not particularly limited, but it is preferably 0.1 to 0.5, is more preferably 0.1 to 0.45, and is even more preferably 0.1 to 0.4. A degree of molar substitution (MS) is defined as an average number of moles of hydroxypropoxy groups and hydroxyethoxy groups bonded per glucose ring unit of cellulose in a molecule of the component (A2). For example, in a case of methyl cellulose, the number of hydroxypropoxy groups and hydroxyethoxy groups bonded is 0, and therefore a degree of molar substitution (MS) is "0."

A degree of substitution (DS) of the component (A2) per glucose is not particularly limited, but it is preferably 1.0 to 4.0, is more preferably 1.0 to 3.5, and is even more preferably 1.0 to 3.0. A degree of substitution (DS) is defined as an average number of hydroxyl groups substituted with methoxy groups per glucose ring unit of cellulose in a molecule of the component (A2).

A viscosity of the component (A2) is not particularly limited, but it is preferably 10 to 30,000 mPa·s in a 2 mass % aqueous solution, is more preferably 100 to 20,000 mPa·s in a 2 mass % aqueous solution, and is even more preferably 200 to 15,000 in a 2 mass % aqueous solution.

A mass ratio (A1)/(A2) of the component (A1) to the component (A2) is not particularly limited, but it is preferably within a range of 1 to 30 from the viewpoint of compatibility between anti-sticking properties and low cost. A lower limit thereof is more preferably 2 or more or 3 or more, and an upper limit thereof is more preferably 25 or less or 20 or less.

1-2. Component (B): Metallic Soap

In the anti-sticking agent composition for an unvulcanized rubber of the present disclosure, the component (B) functions as, for example, a lubricant, and functions so that dispersibility of the component (A) is increased, thereby improving anti-sticking properties.

Types of the component (B) (metallic soap (B)) are not particularly limited. Furthermore, only one type may be used, or a plurality of types may be used in combination. The metallic soap (B) is, for example, a salt other than sodium salts and potassium salts among metal salts of a higher fatty acid or its derivative, and is, for example, a salt other than alkali metal salts among the metal salts. The higher fatty acid is, for example, a fatty acid having 12 or more carbon atoms. An upper limit of the carbon number is, for example, 20 or less although it is not particularly limited. The derivative of the higher fatty acid may be, for example, a higher fatty acid substituted with one or a plurality of substituents. Specific examples of the metallic soap (B) include calcium caprylate, zinc caprylate, magnesium caprylate, calcium caprate, zinc caprate, magnesium caprate, calcium laurate, zinc laurate, magnesium laurate, calcium myristate, zinc myristate, magnesium myristate, calcium palmitate, zinc palmitate, magnesium palmitate, calcium stearate, zinc stearate, magnesium stearate, aluminum stearate, aluminum trioctadecanoate, aluminum dioctadecanoate, aluminum monooctadecanoate, calcium octadecate, zinc octadecate, magnesium octadecate, calcium oleate, zinc oleate, magnesium oleate, calcium behenate, zinc behenate, magnesium behenate, calcium 12-hydroxystearate, zinc 12-hydroxystearate, magnesium 12-hydroxystearate, calcium 14-octadecanoate, zinc 14-octadecanoate, magnesium 14-octadecanoate, calcium 8-octadecanate, zinc 8-octadecanate, magnesium 8-octadecanate, calcium 6-octadecaneate, zinc 6-octadecaneate, magnesium 6-octadecaneate, palm fatty acid calcium, palm fatty acid zinc, palm fatty acid magnesium, palm oil fatty acid calcium, palm oil fatty acid zinc, palm oil fatty acid magnesium, palm kernel oil fatty acid calcium, palm kernel oil fatty acid zinc, palm kernel oil fatty acid magnesium, beef tallow fatty acid calcium, beef tallow fatty acid zinc, beef tallow fatty acid magnesium, castor oil fatty acid calcium, castor oil fatty acid zinc, castor oil fatty acid magnesium, and the like.

The metallic soap (B) is preferably a divalent metal salt of a fatty acid having an average carbon chain length of 12 to 20, and is more preferably a divalent metal salt of a higher fatty acid having 14 to 20 or 16 to 18 carbon atoms. Alternatively, the metallic soap (B) is preferably a calcium salt, a magnesium salt, or a zinc salt. Among them, Ca stearate, Zn stearate, and Mg stearate are preferable from the viewpoint of a large distribution amount and easy availability at low cost.

A content (formulation amount) of the metallic soap (B) is not particularly limited. For example, it is 2 to 20 mass % or 3 to 18 mass % with respect to a total mass of the anti-sticking agent composition for an unvulcanized rubber of the present disclosure; and for example, it is 20 to 60 mass % with respect to a total mass of the all components (solid contents) other than water. With respect to a total mass of the all components other than water, when a mass of the metallic soap (B) is 20 mass % or more, this is preferable from the viewpoint of a lubricating ability of an anti-sticking film, and when a mass is 60 mass % or less, this is preferable from the viewpoint of inhibiting dispersion of a powder of the anti-sticking agent composition for an unvulcanized rubber, and inhibiting a deterioration in handleability due to a high viscosity. With respect to a total mass of the all components (solid contents) other than water, a content (formulation amount) of the metallic soap (B) may be, for example, 25 mass % or more or 30 mass % or more, and may be, for example, 50 mass % or less, 45 mass % or less, or 40 mass % or less.

A mass ratio (A)/(B) of the component (A) to the metallic soap (B) is not particularly limited, but it is, for example, within a range of 0.5 to 6. When a mass ratio is 0.5 or more, it is easy to inhibit dispersion of a powder of the anti-sticking agent composition for an unvulcanized rubber, and when a mass ratio is 6 or less, it is easy to obtain an effect of improving anti-sticking properties by mixing and dispersing the component (A) and the metallic soap (B). A lower limit value of a mass ratio (A)/(B) of the component (A) to the metallic soap (B) is more preferably 0.6 or more or 0.8 or more, and an upper limit value thereof is more preferably 5 or less, 4 or less, or 3 or less.

1-3. Component (C): Surfactant

In the anti-sticking agent composition for an unvulcanized rubber of the present disclosure, a content of the component (C), that is, a surfactant (hereinafter sometimes referred to as a "surfactant (C)") is not particularly limited. For example, it is 1 to 10 mass % or 2 to 8 mass % with respect to a total mass of the anti-sticking agent composition for an unvulcanized rubber of the present disclosure; and for example, it is 8 to 20 mass % with respect to a total mass of the all components (solid contents) other than water. With respect to a total mass of the components other than water, when a content of the surfactant (C) is 8 mass % or more, for example, an effect of dispersing the metallic soap (B) is improved, and thereby an anti-sticking agent is unlikely to be separated, and when a content thereof is 20 mass % or less, for example, dispersibility is appropriately suppressed, and thereby adherability becomes favorable, and anti-sticking properties become favorable. With respect to a total mass of the components other than water, a content of the surfactant (C) may be, for example, 10 mass % or more or 12 mass % or more, and may be, for example, 18 mass % or less or 16 mass % or less. A method of measuring adherability to an unvulcanized rubber is not particularly limited, but for example, measurement can be performed by a measurement method described in examples to be described later.

For example, the surfactant (C) imparts dispersibility of the anti-sticking agent composition for an unvulcanized rubber of the present disclosure in water, and improves adherability to an unvulcanized rubber by improving wettability. The surfactant (C) is not particularly limited, and only one type or a plurality of types may be used in combination. For example, at least one of an anionic surfactant and a non-ionic surfactant may be used. The anionic surfactant is not particularly limited, and examples thereof include the following (i) to (iv), and the like. In addition, the non-ionic surfactant is not particularly limited, and examples thereof include the following (v) and the like.

(i) Carboxylic acid-type anionic surfactants such as higher fatty acid salts, alkyl ether carboxylate salts, polyoxyalkylene ether carboxylate salts, alkyl (or alkenyl) amide ether carboxylate salts, and acylaminocarboxylate salts (ii) Sulfuric acid ester-type anionic surfactants such as higher alcohol sulfate ester salts, polyoxyalkylene higher alcohol sulfate ester salts, alkylphenyl ether sulfate ester salts, polyoxyalkylene alkylphenyl ether sulfate ester salts, and glycerin fatty acid ester monosulfate ester salts (iii) Sulfonic acid-type anionic surfactants such as alkane sulfonate salts, α-olefin sulfonate salts, linear alkylbenzene sulfonate salts, α-sulfo fatty acid ester salts, and dialkyl sulfosuccinate salts (iv) Phosphoric acid ester-type anionic surfactants such as alkyl phosphate ester salts, polyoxyalkylene alkyl phosphate ester salts, polyoxyalkylene alkylphenyl phosphate ester salts, and glycerin fatty acid ester monophosphate ester salts (v) Polyoxyalkylene alkyl ether-type non-ionic surfactants A counterion of the anionic surfactant is not particularly limited, but alkali metals such as sodium and potassium, and alkanolamines such as monoethanolamine and diethanolamine are preferable. For these examples, one type may be used alone, or a plurality of types may be used in combination.

As the anionic surfactant, dialkyl sulfosuccinate salts are preferable, and dioctyl sulfosuccinate Na salts are more preferable, because then it is possible to obtain an anti-sticking agent composition having excellent wettability with respect to a surface of an unvulcanized rubber.

The non-ionic surfactant is not particularly limited, but in the present disclosure, it is possible to use, for example, a non-ionic surfactant represented by Formula (1). It is presumed that together with the anionic surfactant, the non-ionic surfactant of Formula (1) reduces a surface tension of the anti-sticking agent composition with respect to a surface of an unvulcanized rubber, and in addition, it exerts an effect of effectively increasing adherability of the anti-sticking agent composition to a surface of an unvulcanized rubber. However, this presumption absolutely does not limit the present disclosure.

$$RO\text{-}(AO)_n\text{-}H \quad (1)$$

In Formula (1), R represents an aliphatic hydrocarbon group having 8 to 18 carbon atoms. The aliphatic hydrocarbon group may be linear or branched. Furthermore, it may be saturated or unsaturated. The number of carbon atoms of R is preferably 12 to 16 and is more preferably 12 or 13 from the viewpoint of excellent dispersibility of the component (A).

AO represents an oxyalkylene group having 2 to 4 carbon atoms, and n is an average number of moles of AO added.

n is, for example, 1 to 30 or 1 to 25. Specifically, n is 1 or more (that is, not 0) from the viewpoint of preventing a decrease in dispersibility of the component (A) due to a decrease in surface activity ability. Furthermore, n is 30 or less or 25 or less from the viewpoint of preventing a decrease in adherability due to excessively high hydrophilicity. It is presumed that a case in which n is within a range of 1 to 30 or 1 to 25 further improves dispersibility of the component (A), and imparts sufficient viscoelasticity to a dried coating of the anti-sticking agent composition for an unvulcanized rubber, thereby improving adherability even when a surface of an unvulcanized rubber is highly hydrophobic. However, this presumption absolutely does not limit the present disclosure.

The oxyalkylene group having 2 to 4 carbon atoms is, for example, a polymerization unit to which an alkylene oxide having 2 to 4 carbon atoms is added (formed by addition polymerization). Specific examples of oxyalkylene groups having 2 to 4 carbon atoms include an oxyethylene group (EO) obtained by adding ethylene oxide, an oxypropylene group (PO) obtained by adding propylene oxide, and an oxybutylene group (BO) obtained by adding butylene oxide. $(AO)_n$ contains at least an oxyethylene group in its structure. When $(AO)_n$ contains a plurality of types of oxyethylene group (EO), oxypropylene group (PO), or oxybutylene group (BO), these groups may be arranged in a block shape or may be arranged randomly. Preferred $(AO)_n$ is composed of only an oxyethylene group (EO) from the viewpoint of excellent balance between hydrophilicity and hydrophobicity.

Specific examples of non-ionic surfactants are not particularly limited, and examples thereof include lauryl ether EO, cetyl ether EO, stearyl ether EO, oleyl ether EO, decyl ether EO, isodecyl ether EO, tridecyl ether EO, secondary alcohol ether EO, synthetic alcohol ether EOPO, lauryl ether EOPO, decyl ether EOPO, isodecyl ether EOPO, tridecyl ether EOPO, stearyl ether EOPO, and the like.

1-4. Water

In the anti-sticking agent composition for an unvulcanized rubber of the present disclosure, a content of water is not particularly limited. With respect to a total mass of the anti-sticking agent composition for an unvulcanized rubber, a content thereof may be, for example, 50 mass % or more, 60 mass % or more, or 70 mass % or more, and it may be, for example, 90 mass % or less, 85 mass % or less, or 80 mass % or less.

For example, water imparts fluidity to the anti-sticking agent composition for an unvulcanized rubber of the present disclosure, and functions so that the anti-sticking agent composition is easily handled. In addition, the water is not particularly limited, but it may be, for example, tap water, distilled water, ion exchange water, or the like.

1-5. Optional Components and the Like

The anti-sticking agent composition for an unvulcanized rubber of the present disclosure may or may not contain optional components other than the components (A) to (C) and water. For example, as necessary, the anti-sticking agent composition for an unvulcanized rubber of the present disclosure may contain additives such as anti-foaming agents, preservatives, wetting adjuvants, viscosity adjuvants, and foreign matter-reducing adjuvants as optional components.

The anti-foaming agent is not particularly limited, and examples thereof include oil-based anti-foaming agents such as castor oil-, sesame oil-, linseed oil-, and animal and vegetable oil-based anti-foaming agents; fatty acid ester anti-foaming agents such as isoamyl stearate-, distearyl succinate-, ethylene glycol distearate-, and butyl stearate-based anti-foaming agents; alcohol-based anti-foaming agents such as polyoxyalkylene monohydric alcohol di-t-amylphenoxyethanol-, 3-heptanol-, and 2-ethylhexanol-based anti-foaming agents; ether-based anti-foaming agents such as a di-t-amylphenoxyethanol 3-heptyl cellosolve nonyl cellosolve 3-heptyl carbitol-based anti-foaming agent; phosphate-based anti-foaming agents such as tributyl osphate- and tris(butoxyethyl) phosphate-based anti-foaming agents; amine-based anti-foaming agents such as a diamilamine-based anti-foaming agent; amide-based anti-foaming agents such as polyalkyleneamide- and acylate polyamine-based anti-foaming agents; mineral oil-based anti-foaming agents; silicone oil-based anti-foaming agents; and the like. For the anti-foaming agent, one type may be used alone, or a plurality of types may be used in combination.

The preservative is not particularly limited, and examples thereof include a derivative of isothiazolinone, and the like. The derivative of isothiazolinone is not particularly limited, and examples thereof include benzisothiazolinone (BIT), methylisothiazolinone (MIT, MI), chloromethylisothiazolinone (CMIT, CMI), octylisothiazolinone (OIT, OI), and dichlorooctylisothiazolinone (DCOIT, DCOI), and derivatives thereof. For the preservative, one type may be used alone, or a plurality of types may be used in combination.

The wetting adjuvant is not particularly limited. Examples thereof include alcohols, and more specific examples thereof include methanol, ethanol, hexanol, glycerin, 1,3-butanediol, propylene glycol, dipropylene glycol, pentylene glycol, hexylene glycol, polyethylene glycol, sorbitol, maltitol, sucrose, erythritol, xylitol, polyethylene glycol, polypropylene glycol, ethylene oxide of polyhydric alcohol, adduct of propylene oxide, and the like. For the wetting adjuvant, one type may be used alone, or a plurality of types may be used in combination.

A viscosity of the anti-sticking agent composition for an unvulcanized rubber of the present disclosure is not particularly limited, but it is preferably 25,000 mPa·s or less, is more preferably 1,000 to 25,000 mPa·s, is even more preferably 2,000 to 25,000 mPa·s, and is particularly preferably 3,000 to 24,000 mPa·s, because then an anti-sticking agent is unlikely to be separated, and thereby handleability (handling) becomes favorable, where these viscosities are measured at 25° C. and at 20 rpm after 10 rotations using BH-type viscometer 3 days after producing the anti-sticking agent composition for an unvulcanized rubber.

2. Method for Producing Anti-Sticking Agent Composition for Unvulcanized Rubber

A method for producing the anti-sticking agent composition for an unvulcanized rubber of the present disclosure is not particularly limited, but for example, the anti-sticking agent composition for an unvulcanized rubber can be produced by mixing the all components of the anti-sticking agent composition for an unvulcanized rubber (the components (A) to (C) and water, and optional components to be blended in as necessary). The order for mixing, and devices and pieces of equipment used for mixing are not particularly limited. For example, there is a method in which water, a water-soluble polymer (the component (A)), and a surfactant (the component (C)) are mixed, and thereafter, a metallic soap (the component (B)) and other optional components are mixed. As described above, devices used for mixing are not particularly limited, but it is possible to use, for example, a device having a configuration including a stirring blade within a container. Specific examples thereof include liquid mixers such as general liquid mixers, vortex mixers, static mixers, homogenizers, and line homo mixers.

3. Method of Using Anti-Sticking Agent Composition for Unvulcanized Rubber and the Like A method of using the anti-sticking agent composition for an unvulcanized rubber of the present disclosure is not particularly limited, but for example, it may be the same as or similar to a general method of using an anti-sticking agent composition for an unvulcanized rubber. Specific examples of methods of using the anti-sticking agent composition for an unvulcanized rubber of the present disclosure are as follows, but the present disclosure is not limited thereto.

As described above, the method of an anti-sticking treatment on an unvulcanized rubber using the anti-sticking agent composition for an unvulcanized rubber of the present disclosure may be include, for example, an anti-sticking treatment process in which the components (A) to (C) in the anti-sticking agent composition for an unvulcanized rubber of the present disclosure are adhered to a surface of an unvulcanized rubber and subjected to an anti-sticking treatment. Adhesion to a surface of an unvulcanized rubber can be performed by, for example, a wet method to be described later. Unvulcanized rubbers that have been subjected to the anti-sticking treatment as described above do not stick to each other even when they are stored in stacked or folded states, for example. Furthermore, it can be said that such a method of an anti-sticking treatment on an unvulcanized rubber is, for example, a method for manufacturing an unvulcanized rubber that has been subjected to an anti-sticking treatment.

The anti-sticking agent composition for an unvulcanized rubber of the present disclosure may be used as it is, or may be used in a form of an aqueous diluted liquid (aqueous dispersion liquid) by being further diluted with water. A concentration of the anti-sticking agent composition for an unvulcanized rubber of the present disclosure when adhesion to a surface of an unvulcanized rubber is not particularly limited, but a total mass of the components other than water may be, for example, 0.5 mass % or more, 1 mass % or more, or 2 mass % or more, and may be for example, 15 mass % or less, 10 mass % or less, or 5 mass % or less, with respect to a total mass of the anti-sticking agent composition for an unvulcanized rubber. When a concentration is not excessively high, it is possible to obtain, for example, effects of less dispersibility and fast drying. When a concentration is not excessively low, it is possible to obtain, for example, effects of high anti-sticking properties and a high lubricating ability. Even a low concentration of the anti-sticking agent composition for an unvulcanized rubber of the present disclosure can exhibit high anti-sticking properties when adhesion to a surface of an unvulcanized rubber, and therefore high anti-sticking properties are exhibited even with a small adhesion amount. In addition, a viscosity when adhesion to a surface of an unvulcanized rubber is not particularly limited, but it may be, for example, 1 mPa·s or more, 5 mPa·s or more, or 10 mPa·s or more, and it may be, for example, 30 mPa·s or less, 20 mPa·s or less, or 15 mPa·s or less. When a viscosity is not excessively high, it is possible to obtain, for example, effects of less dispersibility and fast drying. When a viscosity is not excessively low, it is possible to obtain, for example, effects of high anti-sticking properties and a high lubricating ability.

As described above, the anti-sticking treatment process may be, for example, a process of adhering the anti-sticking agent composition for an unvulcanized rubber of the present disclosure or an aqueous dispersion liquid of an anti-sticking agent composition for an unvulcanized rubber of the present disclosure to a surface of an unvulcanized rubber, further volatilizing water, and thereby adhering the components (A) to (C) in the anti-sticking agent composition for an unvulcanized rubber of the present disclosure to the surface of the unvulcanized rubber. More specifically, the anti-sticking treatment process may include, for example, a process of adhering an anti-sticking agent composition for an unvulcanized rubber in which the anti-sticking agent composition for an unvulcanized rubber of the present disclosure is adhered to a surface of an unvulcanized rubber, and a drying process of drying the anti-sticking agent composition for an unvulcanized rubber on the surface of the unvulcanized rubber to form a film on the surface of the unvulcanized rubber. Such an anti-sticking treatment process is referred to as, for example, a wet method. The wet method is not particularly limited, but for example, it can be performed in the same manner as a wet method for a general anti-sticking agent composition for an unvulcanized rubber.

In the process of adhering an anti-sticking agent composition for an unvulcanized rubber, for example, it is preferable to adhere the anti-sticking agent composition for an unvulcanized rubber to an unvulcanized rubber in a high-temperature state (for example, about 80° C. to 150° C.) caused by heat when molding the rubber into a sheet shape or the like.

Examples of specific methods of the process of adhering an anti-sticking agent composition for an unvulcanized rubber include a method of spraying the anti-sticking agent composition for an unvulcanized rubber on an unvulcanized rubber with a shower device, a dip method of immersing an unvulcanized rubber in a tank containing the anti-sticking agent composition for an unvulcanized rubber for a short time, and the like. Furthermore, a method of applying the anti-sticking agent composition for an unvulcanized rubber to an unvulcanized rubber using an application device, and the like may be adopted, and these methods may be used in combination as appropriate.

As described above, according to the anti-sticking agent composition for an unvulcanized rubber of the present disclosure, dust can be reduced, high anti-sticking properties can be exhibited even with a small adhesion amount, and a high lubricating ability can be obtained.

The type of rubber to which the anti-sticking agent composition for an unvulcanized rubber of the present disclosure can be applied is not particularly limited, and any rubber may be used as long as it is unvulcanized. Examples of types of rubber include rubbers such as natural rubber (NR), butadiene rubber (BR), styrene-butadiene rubber (SBR), butyl rubber (IIR), and ethylene propylene rubber (EPDM), and a rubber in which a plurality of these rubbers are mixed.

As described above, the anti-sticking agent composition for an unvulcanized rubber and the aqueous dispersion liquid of an anti-sticking agent composition for an unvulcanized rubber of the present disclosure can achieve both excellent anti-sticking properties and excellent removability as a substance adhered to equipment. Furthermore, according to the anti-sticking agent composition for an unvulcanized rubber and the aqueous dispersion liquid of an anti-sticking agent composition for an unvulcanized rubber of the present disclosure, it is possible to obtain, for example, the following effects. First, for example, low cost can be realized by not using organic particles. Furthermore, for example, excellent anti-sticking properties can be exhibited even with respect to natural rubber (NR) by using the component (A1) and the component (A2) in combination. Furthermore, by using the component (A1) and the component (A2) in combination, for example, excellent anti-sticking properties can be exhibited even when dispersibility of the metallic soap (B) is lowered because the anti-sticking agent composition for an unvulcanized rubber and the aqueous dispersion liquid of an anti-sticking agent composition for an unvulcanized rubber are used for a high-temperature rubber.

EXAMPLES

Next, examples of the present disclosure will be described. However, the present disclosure is not limited to the following examples.

Example 1

An anti-sticking agent composition for an unvulcanized rubber of Example 1 was produced as follows.

First, 710 g of water was put in a reaction container and heated to 80° C. or higher. Thereafter, 150 g of polyvinyl alcohol (trade name "KURARAY POVAL 60-98," manufactured by Kuraray Co., Ltd., degree of saponification: 98.0% to 99.0%, viscosity: 4%, and 54.0 to 66.0 mPa·s) as a component (A1), and 8 g of hydroxypropyl methylcellulose (trade name "METOLOSE 60SH-4000," manufactured by Shin-Etsu Chemical Co., Ltd., degree of methoxy group substitution: 1.9, number of moles of hydroxypropoxy group substitution: 0.25, viscosity: 2%, and 4,000 mPa·s) as a component (A2) were put and mixed for 2 hours, and the mixture was cooled to 30° C. or lower. Thereafter, 100 g of calcium stearate (manufactured by TAIHEI CHEMICAL INDUSTRIAL CO., LTD.) as a component (B), 15 g of a palm alcohol EO adduct (trade name "LEOX (registered trademark) CC-150," manufactured by LION SPECIALTY CHEMICALS CO., LTD.) and 15 g of sodium alpha-olefin sulfonate (trade name "LIPOLAN (registered trademark) LB-840," manufactured by LION SPECIALTY CHEMICALS CO., LTD.) as components (C), and 2 g of a preservative (trade name "Topside 609," manufactured by Permachem Asia Ltd.) were added into the mixture and stirred. Thereby, an anti-sticking agent composition for an unvulcanized rubber of Example 1 was produced. The obtained anti-sticking agent composition for an unvulcanized rubber was in a liquid state.

Examples 2 to 24 and Comparative Examples 1 to 3

Anti-sticking agent compositions for an unvulcanized rubber of Examples 2 to 24 and Comparative Examples 1 to 3 were produced in the same manner as in Example 1 except that types and compositions of raw materials were changed as shown in Tables 2 to 4 to be shown later. Table 1 below shows trade names (product names), manufacturers, and characteristics (compositions) of each of raw materials used in the production of the anti-sticking agent compositions for an unvulcanized rubber of Examples 1 to 24 and Comparative Examples 1 to 3.

TABLE 1

| Raw material composition | Component | Product name | Manufacturer | Composition |
|---|---|---|---|---|
| A1 | Carboxymethyl cellulose 1 | CMC DAICEL 1220 | Daicel FineChem Ltd. | Degree of etherification: 0.8 to 10, viscosity: 1%, and 10 to 20 mPa·s |
| | Carboxymethyl cellulose 2 | CMC DAICEL 2260 | Daicel FineChem Ltd. | Degree of etherification: 0.8 to 10, viscosity: 1%, and 4,000 to 6,000 mPa·s |
| | Water-soluble acrylic polymer 1 | JURYMER AC-10NPD | TOAGOSEI CO., LTD. | Sodium polyacrylate, viscosity: 40%, and 100 to 300 mPa·s |
| | Water-soluble acrylic polymer 2 | RHEOGIC 262L | TOAGOSEI CO., LTD. | Sodium polyacrylate, viscosity: 0.5%, and 1,500 to 3,000 mPa·s |
| | Polyvinyl alcohol 1 | KURARAY POVAL 9-88 | Kuraray Co., Ltd. | Partially saponified, degree of saponification: 87.0 to 89.0, viscosity: 4%, and 8.0 to 10.0 mPa·s |
| | Polyvinyl alcohol 2 | KURARAY POVAL 95-88 | Kuraray Co., Ltd. | Partially saponified, degree of saponification: 87.0 to 89.0, viscosity: 4%, and 80.0 to 110.0 mPa·s |
| | Polyvinyl alcohol 3 | KURARAY POVAL 11-98 | Kuraray Co., Ltd. | Partially saponified, degree of saponification: 98.0 to 99.0, viscosity: 4%, and 10.2 to 11.8 mPa·s |
| | Polyvinyl alcohol 4 | KURARAY POVAL 60-98 | Kuraray Co., Ltd. | Partially saponified, degree of saponification: 98.0 to 99.0, viscosity: 4%, and 54.0 to 66.0 mPa·s |
| A2 | Hydroxypropyl methylcellulose 1 | METOLOSE 60SH-15 | Shin-Etsu Chemical Co., Ltd. | Degree of methoxy group substitution: 1.9, number of moles of hydroxypropoxy group substitution: 0.25, viscosity: 2%, and 15 mPa·s |
| | Hydroxypropyl methylcellulose 2 | METOLOSE 60SH-4000 | Shin-Etsu Chemical Co., Ltd. | Degree of methoxy group substitution: 1.9, number of moles of hydroxypropoxy group substitution: 0.25, viscosity: 2%, and 4,000 mPa·s |
| | Hydroxypropyl methylcellulose 3 | METOLOSE 65SH-4000 | Shin-Etsu Chemical Co., Ltd. | Degree of methoxy group substitution: 1.8, number of moles of hydroxypropoxy group substitution: 0.15, viscosity: 2%, and 4,000 mPa·s |
| | Hydroxypropyl methylcellulose 4 | METOLOSE 90SH-4000 | Shin-Etsu Chemical Co., Ltd. | Degree of methoxy group substitution: 1.4, number of moles of hydroxypropoxy group substitution: 0.20, viscosity: 2%, and 4,000 mPa·s |
| | Hydroxypropyl methylcellulose 5 | METOLOSE 90SH-100000 | Shin-Etsu Chemical Co., Ltd. | Degree of methoxy group substitution: 1.4, number of moles of hydroxypropoxy group substitution: 0.20, viscosity: 2%, and 100,000 mPa·s |
| | Hydroxyethyl cellulose 1 | HEC DAICEL SP200 | Daicel FineChem Ltd. | Viscosity: 5%, and 80 to 170 mPa·s |
| | Hydroxyethyl cellulose 2 | HEC DAICEL SP900 | Daicel FineChem Ltd. | Viscosity: 1%, and 4,000 to 5,500 mPa·s |
| | Hydroxyethyl methylcellulose 1 | METOLOSE SEB-4000 | Shin-Etsu Chemical Co., Ltd. | Degree of methoxy group substitution: 1.5, number of moles of hydroxypropoxy group substitution: 0.20, viscosity: 2%, and 4,000 mPa·s |
| | Methyl cellulose 1 | METOLOSE SM-15 | Shin-Etsu Chemical Co., Ltd. | Degree of methoxy group substitution: 1.8, viscosity: 2%, and 25 mPa·s |
| | Methyl cellulose 2 | METOLOSE SM-4000 | Shin-Etsu Chemical Co., Ltd. | Degree of methoxy group substitution: 1.8, viscosity: 2%, and 4,000 mPa·s |
| B | Ca stearate | Calcium stearate | TAIHEI CHEMICAL INDUSTRIAL CO., LTD. | |
| | Mg stearate | Magnesium stearate | TAIHEI CHEMICAL INDUSTRIAL CO., LTD. | |
| C | Palm alcohol EO adduct | LEOX CC-150 | LION SPECIALTY CHEMICALS CO., LTD. | 15 moles of palm alcohol EO adduct |
| | Na alpha-olefin sulfonate | LIPOLAN LB-840 | LION SPECIALTY CHEMICALS CO., LTD. | Sodium α-olefin sulfonate |
| | Preservative | Topside 609 | Permachem Asia Ltd. | BIT-based preservative |

Production of aqueous dispersion liquid of anti-sticking agent composition for unvulcanized rubber, and performance evaluation thereof The anti-sticking agent composition for an unvulcanized rubber of each of the above examples and comparative examples was diluted 20-fold with water, and thereby an aqueous dispersion liquid of an anti-sticking agent composition for an unvulcanized rubber (anti-sticking agent suspension) was produced. An anti-sticking treatment on an unvulcanized rubber was performed using this aqueous dispersion liquid of an anti-sticking agent composition for an unvulcanized rubber to evaluate each performance of anti-sticking properties, a lubricating ability, dispersibility, and removability as a substance adhered to equipment. A method for the anti-sticking treatment, and an evaluation method for each of the performances are shown below.

(1) Rubber for Evaluation

Evaluation

For various evaluations, the following unvulcanized SBR rubber and unvulcanized NR rubber were used as rubbers for evaluation.

Unvulcanized SBR Rubber

An unvulcanized SBR rubber (151.5 parts by mass in total) was used in which 30 parts by mass of SAF carbon (trade name "DIABLACK A," manufactured by Mitsubishi Chemical Corporation), 15 parts by mass of JSRAROMA (process oil) (trade name "AROMA 790," manufactured by Japan Sun Oil Company, Ltd.), 3 parts by mass of zinc oxide (2 types of zinc oxide, manufactured by HakusuiTech Co., Ltd.), 1 part by mass of stearic acid (CAMELLIA, manufactured by NOF CORPORATION), 1 part by mass of 6PPD (trade name "Nocrac 6C," manufactured by OUCHI SHINKO CHEMICAL INDUSTRIAL CO., LTD.), 1 part by mass of CBS (trade name "Nocceler CZ-G," manufactured by OUCHI SHINKO CHEMICAL INDUSTRIAL CO., LTD.), and 1.5 parts by mass of sulfur (manufactured by Tsurumi Chemical Industry Co., ltd.) were blended in 100 parts by mass of SBR (trade name "TUFDENE 4850," manufactured by Asahi Kasei Corporation).

Unvulcanized NR Rubber

An unvulcanized NR rubber (162.5 parts by mass in total) was used in which 10 parts by mass of white carbon (trade name "Nipsil VN-3," manufactured by TOSOH SILICA CORPORATION), 30 parts by mass of ISAF Black (trade name "SEAST 6," manufactured by Tokai Carbon Co., Ltd.), 15 parts by mass of JSRAROMA (process oil) (trade name "AROMA 790," manufactured by Japan Sun Oil Company, Ltd.), 3 parts by mass of zinc oxide (2 types of zinc oxide, manufactured by HakusuiTech Co., Ltd.), 1 part by mass of stearic acid (CAMELLIA, manufactured by NOF CORPORATION), 1 part by mass of 6PPD (trade name "Nocrac 6C," manufactured by OUCHI SHINKO CHEMICAL INDUSTRIAL CO., LTD.), 1 part by mass of CBS (trade name "Nocceler CZ-G," manufactured by OUCHI SHINKO CHEMICAL INDUSTRIAL CO., LTD.), and 1.5 parts by mass of sulfur (manufactured by Tsurumi Chemical Industry Co., ltd.) were blended in 100 parts by mass of NR (RSS #3).

(2) Evaluation of Anti-Sticking Properties

The above unvulcanized rubber was kneaded with an open roll at a temperature of 80° C. to 120° C. to form a rubber sheet (thickness: 5 to 8 mm, 60 cm×15 cm). The just kneaded rubber sheet was immersed for about 1 second in 1 L of an aqueous dispersion liquid of an anti-sticking agent composition for an unvulcanized rubber (anti-sticking agent suspension, temperature 40° C.) obtained by diluting the anti-sticking agent composition for an unvulcanized rubber obtained in each of Examples 1 to 24 and Comparative Examples 1 to 3 20-fold with water. Thereafter, the rubber sheet was quickly pulled up vertically, allowed to stand still in a vertical state at room temperature, and air-dried. In this manner, an anti-sticking treatment was performed on the rubber sheet (unvulcanized rubber).

The rubber sheet after being subjected to the anti-sticking treatment was cut into a size of 6 cm×15 cm. Two pieces were laminated to form a test piece in a lamination state. A load of 1 t/m$^2$ was applied to this test piece in the lamination state in a vertical direction from one surface, and the test piece was left at 60° C. for 12 hours.

Thereafter, a temperature of the test piece was returned to room temperature. A 180° peeling test was performed using a tensile tester [AGS-500D type, SHIMADZU], and a peeling drag force (N/cm) was measured at a tensile speed of 300 mm/min. It is shown that as a peeling drag force (N/cm) became smaller, anti-sticking properties became excellent.

(3) Lubricating Ability

The rubber sheet (unvulcanized rubber) was subjected to an anti-sticking treatment by the same method as in (2) Evaluation of anti-sticking properties. Next, a sheet of the dried unvulcanized rubber that had been subjected to the anti-sticking treatment was cut into a rectangle of 5×15 cm. This rubber piece was placed on a stainless steel plate. The plate was gradually tilted, and a tilt angle when the rubber piece slid down was measured. It is shown that as a sliding angle became smaller, a lubricating ability became excellent.

(4) Dispersibility

The rubber sheet (unvulcanized rubber) was subjected to an anti-sticking treatment by the same method as in (2) Evaluation of anti-sticking properties. Next, a sheet of the dried unvulcanized rubber that had been subjected to the anti-sticking treatment was cut into a rectangle of 6×15 cm, and a weight thereof was measured. Front and back surfaces of this rubber piece were swept 10 times with a brush. Thereafter, a weight thereof was measured again to calculate an amount of dispersion. It is shown that as an amount of dispersion became smaller, dispersibility became excellent.

(5) Removability as Substance Adhered to Piece of Equipment 15 g of the anti-sticking agent composition for an unvulcanized rubber of each of Examples 1 to 24 or Comparative Examples 1 to 3 was applied onto a 6×6 cm region of a stainless metal plate (SUS304), and was dried for 3 hours under a condition of 120° C. using a hot air dryer. Thereby, a film that is a dried substance of the anti-sticking agent composition for an unvulcanized rubber was obtained. A part of the dried substance film was peeled off. Thereafter, the peeled portion was sandwiched with tweezers, and this sandwiched portion was pulled up using the tweezers so that the remaining part of the dried substance film was peeled off from the metal plate as much as possible. Thereafter, a remaining amount of the dried substance on the metal plate was visually confirmed, and determination was made in 5 stages of the following 1 to 5.

1: 0% to 30% of an area on the metal plate to which the dried substance was adhered could be peeled off.
2: 31% to 50% of an area on the metal plate to which the dried substance was adhered could be peeled off.
3: 51% to 70% of an area on the metal plate to which the dried substance was adhered could be peeled off.
4: 71% to 90% of an area on the metal plate to which the dried substance was adhered could be peeled off.
5: 91% to 100% of an area on the metal plate to which the dried substance was adhered could be peeled off.

Tables 2 to 4 collectively show types and compositions of raw materials in the anti-sticking agent composition for an unvulcanized rubber of each of Examples 1 to 24 and Comparative Examples 1 to 3, and evaluation results of each performance of anti-sticking properties, a lubricating ability, dispersibility, and removability as a substance adhered to equipment, which were evaluated as described above. In Tables 2 to 4, a numerical value indicating a usage amount of each raw material (including water) is a content (mass %) with respect to a total mass (including water) of the anti-sticking agent composition for an unvulcanized rubber. Furthermore, "A proportion," "A1 proportion," "A2 proportion," "B proportion," and "C proportion" respectively show a numerical value indicating a content (mass %) of the component (A), the component (A1), the component (A2), the component (B), and component (C), with respect to 100 mass % of the all components other than water in the anti-sticking agent composition for an unvulcanized rubber. "A/B" is a ratio obtained by dividing a mass of the component (A) by a mass of the component (B). "A1/A2" is a ratio obtained by dividing a mass of the component (A1) by a mass of the component (A2).

TABLE 2

| | Raw material | Example 1 | Example 2 | Example 3 | Example 4 | Example 5 | Example 6 | Example 7 | Example 8 | Example 9 |
|---|---|---|---|---|---|---|---|---|---|---|
| A1 | Carboxymethyl cellulose 1 | | | | | 12 | | | | |
| | Carboxymethyl cellulose 2 | | | | | | 12 | | | |
| | Water-soluble acrylic polymer 1 | | | | | | | 12 | | |
| | Water-soluble acrylic polymer 2 | | | | | | | | 12 | |
| | Polyvinyl alcohol 1 | | | | | | | | | 12 |
| | Polyvinyl alcohol 2 | | | | | | | | | |
| | Polyvinyl alcohol 3 | | | | | | | | | |
| | Polyvinyl alcohol 4 | 15 | 15 | 12 | 8 | | | | | |
| A2 | Hydroxypropyl methylcellulose 1 | | | | | | | | | |
| | Hydroxypropyl methylcellulose 2 | 0.8 | 4 | 0.8 | 0.8 | 0.8 | 0.8 | 0.8 | 0.8 | 0.8 |
| | Hydroxypropyl methylcellulose 3 | | | | | | | | | |
| | Hydroxypropyl methylcellulose 4 | | | | | | | | | |
| | Hydroxypropyl methylcellulose 5 | | | | | | | | | |
| | Hydroxyethyl cellulose 1 | | | | | | | | | |
| | Hydroxyethyl cellulose 2 | | | | | | | | | |
| | Hydroxyethyl methylcellulose 1 | | | | | | | | | |
| | Methyl cellulose 1 | | | | | | | | | |
| | Methyl cellulose 2 | | | | | | | | | |
| B | Ca stearate | 10 | 10 | 4.5 | 16 | 4.5 | 4.5 | 4.5 | 4.5 | 4.5 |
| | Mg stearate | | | | | | | | | |
| C | Palm alcohol EO adduct | 1.5 | 1.5 | 1.5 | 1.5 | 1.5 | 1.5 | 1.5 | 1.5 | 1.5 |
| | Na alpha-olefin sulfonate | 1.5 | 1.5 | 1.5 | 1.5 | 1.5 | 1.5 | 1.5 | 1.5 | 1.5 |
| | Preservative | 0.2 | 0.2 | 0.2 | 0.2 | 0.2 | 0.2 | 0.2 | 0.2 | 0.2 |
| | Water | 71 | 67.8 | 79.5 | 72 | 79.5 | 79.5 | 79.5 | 79.5 | 79.5 |
| | A proportion | 54.9 | 59.4 | 63.1 | 31.7 | 63.1 | 63.1 | 63.1 | 63.1 | 63.1 |
| | A1 proportion | 52.1 | 46.9 | 59.1 | 28.8 | 59.1 | 59.1 | 59.1 | 59.1 | 59.1 |
| | A2 proportion | 2.8 | 12.5 | 3.9 | 2.9 | 3.9 | 3.9 | 3.9 | 3.9 | 3.9 |
| | B proportion | 34.7 | 31.3 | 22.2 | 57.6 | 22.2 | 22.2 | 22.2 | 22.2 | 22.2 |
| | C proportion | 10.4 | 9.4 | 14.8 | 10.8 | 14.8 | 14.8 | 14.8 | 14.8 | 14.8 |
| | A/B | 1.6 | 1.9 | 2.8 | 0.6 | 2.8 | 2.8 | 2.8 | 2.8 | 2.8 |
| | A1/A2 | 18.8 | 3.8 | 15.0 | 10.0 | 15.0 | 15.0 | 15.0 | 15.0 | 15.0 |
| | Anti-sticking property 1 (N/cm) SBR | 0.2 | <0.1 | 0.2 | 0.2 | 0.4 | 0.1 | 0.5 | 0.2 | 0.4 |
| | Anti-sticking property 2 (N/cm) NR | 1.2 | 0.5 | 1.2 | 1.2 | 1.9 | 1.1 | 2.0 | 1.3 | 1.9 |
| | Lubricating ability (degree) | 25 to 30 | 25 to 30 | 40 to 45 | 20 to 25 | 40 to 45 | 40 to 45 | 40 to 45 | 40 to 45 | 40 to 45 |
| | Removability as substance adhered to piece of equipment (level) | 5 | 5 | 5 | 5 | 5 | 5 | 5 | 5 | 5 |
| | Dispersibility (mg/100 cm$^2$) | 0.1 | 0.1 | 0.1 | 0.4 | 0.1 | 0.1 | 0.1 | 0.1 | 0.1 |
| | Viscosity (25° C., BH, 20 rpm) | 13000 | 22000 | 8000 | 24000 | 2000 | 18000 | 8000 | 11000 | 5000 |

TABLE 3

| | Raw material | Example 10 | Example 11 | Example 12 | Example 13 | Example 14 | Example 15 | Example 16 | Example 17 | Example 18 |
|---|---|---|---|---|---|---|---|---|---|---|
| A1 | Carboxymethyl cellulose 1 | | | | | | | | | |
| | Carboxymethyl cellulose 2 | | | 12 | 12 | 12 | 12 | 12 | 12 | 12 |
| | Water-soluble acrylic polymer 1 | | | | | | | | | |
| | Water-soluble acrylic polymer 2 | | | | | | | | | |
| | Polyvinyl alcohol 1 | | | | | | | | | |
| | Polyvinyl alcohol 2 | 12 | | | | | | | | |
| | Polyvinyl alcohol 3 | | 12 | | | | | | | |
| | Polyvinyl alcohol 4 | | | | | | | | | |
| A2 | Hydroxypropyl methylcellulose 1 | | | 0.8 | | | | | | |
| | Hydroxypropyl methylcellulose 2 | 0.8 | 0.8 | | | | | | | |
| | Hydroxypropyl methylcellulose 3 | | | | 0.8 | | | | | |
| | Hydroxypropyl methylcellulose 4 | | | | | 0.8 | | | | |
| | Hydroxypropyl methylcellulose 5 | | | | | | 0.8 | | | |
| | Hydroxyethyl cellulose 1 | | | | | | | 0.8 | | |
| | Hydroxyethyl cellulose 2 | | | | | | | | 0.8 | |
| | Hydroxyethyl methylcellulose 1 | | | | | | | | | 0.8 |
| | Methyl cellulose 1 | | | | | | | | | |
| | Methyl cellulose 2 | | | | | | | | | |

TABLE 3-continued

| | Raw material | Example 10 | Example 11 | Example 12 | Example 13 | Example 14 | Example 15 | Example 16 | Example 17 | Example 18 |
|---|---|---|---|---|---|---|---|---|---|---|
| B | Ca stearate | 4.5 | 4.5 | 4.5 | 4.5 | 4.5 | 4.5 | 4.5 | 4.5 | 4.5 |
| | Mg stearate | | | | | | | | | |
| C | Palm alcohol EO adduct | 1.5 | 1.5 | 1.5 | 1.5 | 1.5 | 1.5 | 1.5 | 1.5 | 1.5 |
| | Na alpha-olefin sulfonate | 1.5 | 1.5 | 1.5 | 1.5 | 1.5 | 1.5 | 1.5 | 1.5 | 1.5 |
| | Preservative | 0.2 | 0.2 | 0.2 | 0.2 | 0.2 | 0.2 | 0.2 | 0.2 | 0.2 |
| | Water | 79.5 | 79.5 | 79.5 | 79.5 | 79.5 | 79.5 | 79.5 | 79.5 | 79.5 |
| | A proportion | 63.1 | 63.1 | 63.1 | 63.1 | 63.1 | 63.1 | 63.1 | 63.1 | 63.1 |
| | A1 proportion | 59.1 | 59.1 | 59.1 | 59.1 | 59.1 | 59.1 | 59.1 | 59.1 | 59.1 |
| | A2 proportion | 3.9 | 3.9 | 3.9 | 3.9 | 3.9 | 3.9 | 3.9 | 3.9 | 3.9 |
| | B proportion | 22.2 | 22.2 | 22.2 | 22.2 | 22.2 | 22.2 | 22.2 | 22.2 | 22.2 |
| | C proportion | 14.8 | 14.8 | 14.8 | 14.8 | 14.8 | 14.8 | 14.8 | 14.8 | 14.8 |
| | A/B | 2.8 | 2.8 | 2.8 | 2.8 | 2.8 | 2.8 | 2.8 | 2.8 | 2.8 |
| | A1/A2 | 15.0 | 15.0 | 15.0 | 15.0 | 15.0 | 15.0 | 15.0 | 15.0 | 15.0 |
| | Anti-sticking property 1 (N/cm) SBR | 0.2 | 0.5 | 0.4 | 0.4 | 0.1 | 0.1 | 0.3 | 0.1 | 0.1 |
| | Anti-sticking property 2 (N/cm) NR | 1.2 | 1.9 | 1.8 | 1.8 | 1.1 | 0.9 | 1.3 | 1.0 | 0.9 |
| | Lubricating ability (degree) | 40 to 45 | 40 to 45 | 40 to 45 | 40 to 45 | 40 to 45 | 40 to 45 | 40 to 45 | 40 to 45 | 40 to 45 |
| | Removability as substance adhered to piece of equipment (level) | 5 | 5 | 5 | 5 | 5 | 5 | 5 | 5 | 5 |
| | Dispersibility (mg/100 cm$^2$) | 0.1 | 0.1 | 0.1 | 0.1 | 0.1 | 0.1 | 0.1 | 0.1 | 0.1 |
| | Viscosity (25° C., BH, 20 rpm) | 10000 | 6000 | 10000 | 14000 | 13000 | 12000 | 5000 | 8000 | 10000 |

TABLE 4

| | Raw material | Example 19 | Example 20 | Example 21 | Example 22 | Example 23 | Example 24 | Comparative Example 1 | Comparative Example 2 | Comparative Example 3 |
|---|---|---|---|---|---|---|---|---|---|---|
| A1 | Carboxymethyl cellulose 1 | | | | | | | | | |
| | Carboxymethyl cellulose 2 | | 12 | 12 | | 6 | 12 | | | |
| | Water-soluble acrylic polymer 1 | | | | | | | | | |
| | Water-soluble acrylic polymer 2 | | | | | | | 6 | | 6 |
| | Polyvinyl alcohol 1 | | | | | | | | | |
| | Polyvinyl alcohol 2 | 12 | | | 12 | | | | | |
| | Polyvinyl alcohol 3 | | | | | | | | | |
| | Polyvinyl alcohol 4 | | | | | | | | | |
| A2 | Hydroxypropyl methylcellulose 1 | | | | | | | | 0.4 | 0.4 |
| | Hydroxypropyl methylcellulose 2 | | | | | | 0.8 | | | |
| | Hydroxypropyl methylcellulose 3 | | | | | | | | | |
| | Hydroxypropyl methylcellulose 4 | | | | | | | | | |
| | Hydroxypropyl methylcellulose 5 | | | | | | | | | |
| | Hydroxyethyl cellulose 1 | | | | | | | | | |
| | Hydroxyethyl cellulose 2 | | | | | | | | | |
| | Hydroxyethyl methylcellulose 1 | 0.8 | | | | | | | | |
| | Methyl cellulose 1 | | 0.8 | | | | | | | |
| | Methyl cellulose 2 | | | 0.8 | 0.8 | 0.8 | | | | |
| B | Ca stearate | 4.5 | 4.5 | 4.5 | 4.5 | 2.5 | | | 2.5 | |
| | Mg stearate | | | | | | 4.5 | 4.5 | | 7 |
| C | Palm alcohol EO adduct | 1.5 | 1.5 | 1.5 | 1.5 | 0.8 | 1.5 | 0.8 | 0.8 | 0.8 |
| | Na alpha-olefin sulfonate | 1.5 | 1.5 | 1.5 | 1.5 | 0.8 | 1.5 | 0.8 | 0.8 | 0.8 |
| | Preservative | 0.2 | 0.2 | 0.2 | 0.2 | 0.2 | 0.2 | 0.2 | 0.2 | 0.2 |
| | Water | 79.5 | 79.5 | 79.5 | 79.5 | 88.9 | 79.5 | 89.7 | 90.8 | 91.8 |
| | A proportion | 63.1 | 63.1 | 63.1 | 63.1 | 62.4 | 63.1 | 59.4 | 4.4 | 80.0 |
| | A1 proportion | 59.1 | 59.1 | 59.1 | 59.1 | 55.0 | 59.1 | 59.4 | 0.0 | 75.0 |
| | A2 proportion | 3.9 | 3.9 | 3.9 | 3.9 | 7.3 | 3.9 | 0.0 | 4.4 | 5.0 |
| | B proportion | 22.2 | 22.2 | 22.2 | 22.2 | 22.9 | 22.2 | 24.8 | 77.8 | 0.0 |
| | C proportion | 14.8 | 14.8 | 14.8 | 14.8 | 14.7 | 14.8 | 15.8 | 17.8 | 20.0 |
| | A/B | 2.8 | 2.8 | 2.8 | 2.8 | 2.7 | 2.8 | 2.4 | 0.1 | — |
| | A1/A2 | 15.0 | 15.0 | 15.0 | 15.0 | 7.5 | 15.0 | — | 0.0 | 15.0 |
| | Anti-sticking property 1 (N/cm) SBR | 0.1 | 0.3 | 0.1 | 0.1 | 0.1 | 0.1 | 0.6 | 1.5 | 0.9 |
| | Anti-sticking property 2 (N/cm) NR | 0.8 | 1.0 | 0.7 | 0.6 | 0.5 | 1.1 | 2.1 | 5.2 | 3.5 |
| | Lubricating ability (degree) | 40 to 45 | 40 to 45 | 40 to 45 | 40 to 45 | 40 to 45 | 40 to 45 | 40 to 45 | 60 to 65 | >90 |
| | Removability as substance adhered to piece of equipment (level) | 5 | 5 | 5 | 5 | 5 | 5 | 2 | 3 | 2 |
| | Dispersibility (mg/100 cm$^2$) | 0.1 | 0.1 | 0.1 | 0.1 | 0.1 | 0.1 | 0.1 | 2.5 | 0.1 |
| | Viscosity (25° C., BH, 20 rpm) | 9000 | 10000 | 13000 | 11000 | 3000 | 10000 | 7000 | 300 | 500 |

As shown in Tables 2 to 4, all the anti-sticking agent compositions for an unvulcanized rubber of Examples 1 to 24 had favorable anti-sticking properties, lubricating ability, dispersibility, and removability as a substance adhered to equipment. On the other hand, as compared with the examples, all the anti-sticking agent compositions for an unvulcanized rubber of Comparative Examples 1 to 3 in which the component (A1), the component (A2), or the component (B) was not used had inferior removability as a substance adhered to equipment. Furthermore, as compared with the examples, the anti-sticking agent compositions for an unvulcanized rubber of Comparative Examples 1 to 3 had inferior in anti-sticking properties to natural rubber (NR). Furthermore, as compared with the examples, the anti-sticking agent composition for an unvulcanized rubber of Comparative Example 2 in which the component (A1) was not used had significantly inferior dispersibility. As compared with the examples, the anti-sticking agent composition for an unvulcanized rubber of Comparative Example 3 in which the component (B) was not used had a significantly inferior lubricating ability, and a rubber piece did not fall off from the stainless steel plate even when the stainless plate was in a vertical direction.

What is claimed is:

1. An anti-sticking agent composition for an unvulcanized rubber comprising:
the following components (A) to (C); and water:
(A) water-soluble polymer,
(B) metallic soap, and
(C) surfactant,
wherein the component (A) contains the following component (A1) and the following component (A2):
(A1) water-soluble polymer other than the component (A2), and
(A2) non-ionic cellulose ether,
wherein, with respect to 100 mass % as a total mass of the components other than the water, the anti-sticking agent composition for an unvulcanized rubber comprising:
25 to 70 mass % of the component (A);
20 to 60 mass % of the component (B); and
8 to 20 mass % of the component (C).

2. The anti-sticking agent composition for an unvulcanized rubber according to claim 1, wherein a mass ratio (A1)/(A2) of the component (A1) to the component (A2) is within a range of 1 to 20.

3. The anti-sticking agent composition for an unvulcanized rubber according to claim 1, wherein a mass ratio (A)/(B) of the component (A) to the component (B) is within a range of 0.5 to 3.

4. An aqueous dispersion liquid of an anti-sticking agent composition for an unvulcanized rubber comprising:
the anti-sticking agent composition for an unvulcanized rubber according to claim 1; and
water.

5. An unvulcanized rubber, having a surface to which the components (A) to (C) in the anti-sticking agent composition for an unvulcanized rubber according to claim 1 are adhered.

6. The anti-sticking agent composition for an unvulcanized rubber according to claim 1, wherein the component (A1) is at least one selected from the group consisting of polyvinyl alcohol, carboxymethyl cellulose, sodium polyacrylate, and a polyacrylamide resin.

7. The anti-sticking agent composition for an unvulcanized rubber according to claim 1, wherein the component (A2) is at least one selected from the group consisting of an alkyl cellulose, a hydroxyalkyl cellulose, or a hydroxyalkyl alkylcellulose.

8. The anti-sticking agent composition for an unvulcanized rubber according to claim 1, wherein the metallic soap (B) is a divalent metal salt of a fatty acid having an average carbon chain length of 12 to 20.

* * * * *